United States Patent
Hata

(10) Patent No.: US 7,349,561 B2
(45) Date of Patent: Mar. 25, 2008

(54) FINGERPRINT INPUT DEVICE AND PERSONAL AUTHENTICATION SYSTEM UTILIZING THE SAME

(75) Inventor: Fumio Hata, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 668 days.

(21) Appl. No.: 10/853,245

(22) Filed: May 26, 2004

(65) Prior Publication Data

US 2004/0240713 A1 Dec. 2, 2004

(30) Foreign Application Priority Data

May 28, 2003 (JP) .............................. 2003-150901

(51) Int. Cl.
*G06K 9/00* (2006.01)

(52) U.S. Cl. ..................................... 382/124

(58) Field of Classification Search ........ 382/115–116, 382/124, 209, 218, 313; 340/5.53
See application file for complete search history.

(56) References Cited

U.S. PATENT DOCUMENTS

| 5,812,252 | A | * | 9/1998 | Bowker et al. | 356/71 |
| 5,974,162 | A | * | 10/1999 | Metz et al. | 382/124 |
| 6,182,892 | B1 | * | 2/2001 | Angelo et al. | 235/380 |
| 6,289,114 | B1 | * | 9/2001 | Mainguet | 382/124 |
| 6,495,836 | B1 | | 12/2002 | Hata | 250/370.09 |
| 6,897,449 | B1 | | 5/2005 | Hata | 250/370.11 |
| 6,927,844 | B2 | * | 8/2005 | Higuchi et al. | 356/71 |

FOREIGN PATENT DOCUMENTS

| JP | 07-174947 | 7/1995 |
| JP | 2000-021780 | 1/2000 |

* cited by examiner

*Primary Examiner*—Daniel Mariam
(74) *Attorney, Agent, or Firm*—Fitzpatrick, Cella, Harper & Scinto

(57) ABSTRACT

The invention provides a fingerprint input device with a small area and a compact structure, and being manufactured in a simple process, comprising an LED for emitting into a finger a light, an image pickup unit for receiving the light scattered inside the finger, a peripheral circuit unit connected to the image pickup unit 1a, a silicon chip 1 bearing image pickup elements constituting the image pickup unit and the peripheral circuit unit, and a fiber optics plate fixed on the silicon chip, having a surface on which the finger is placed and constituting light transmission portion for transmitting the light, scattered inside the finger placed on the surface to the image pickup element along a direction inclined by a predetermined angle. At least a part of the peripheral circuit unit is formed on the silicon chip opposed to a non-light-transmitting area of the fiber optics plate.

9 Claims, 4 Drawing Sheets

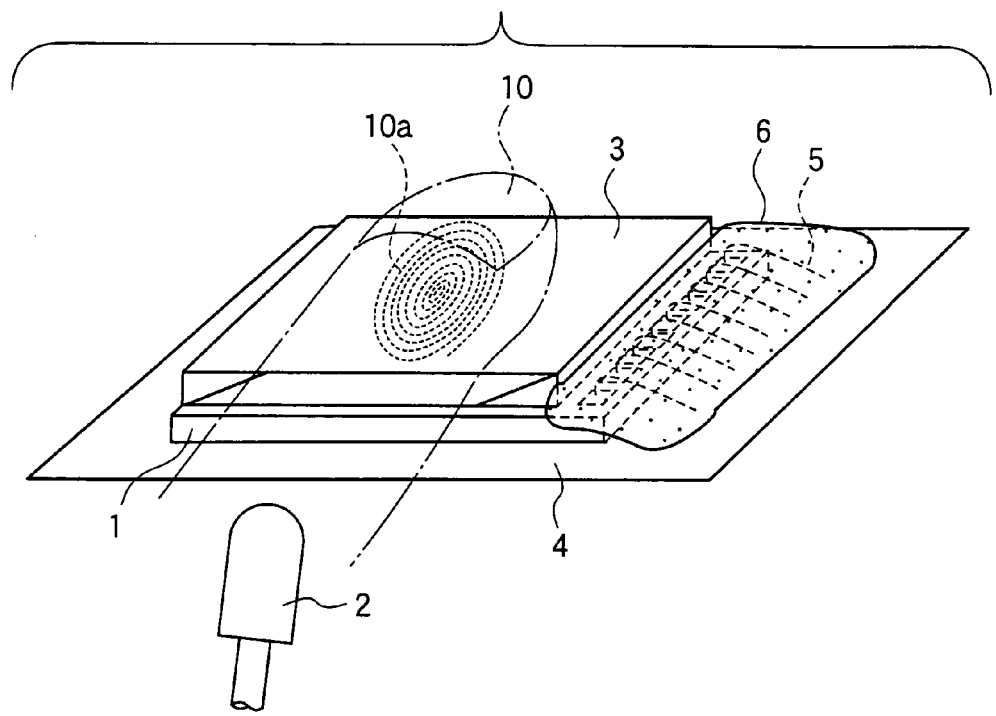
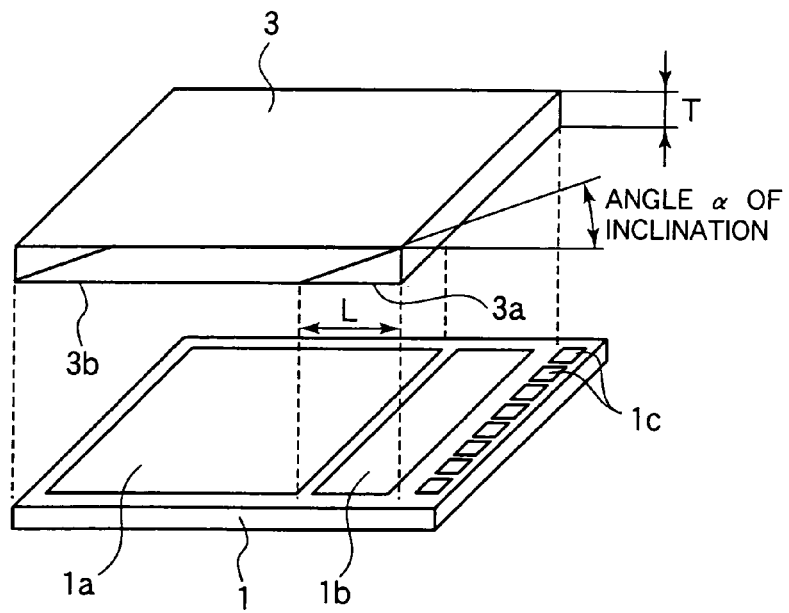

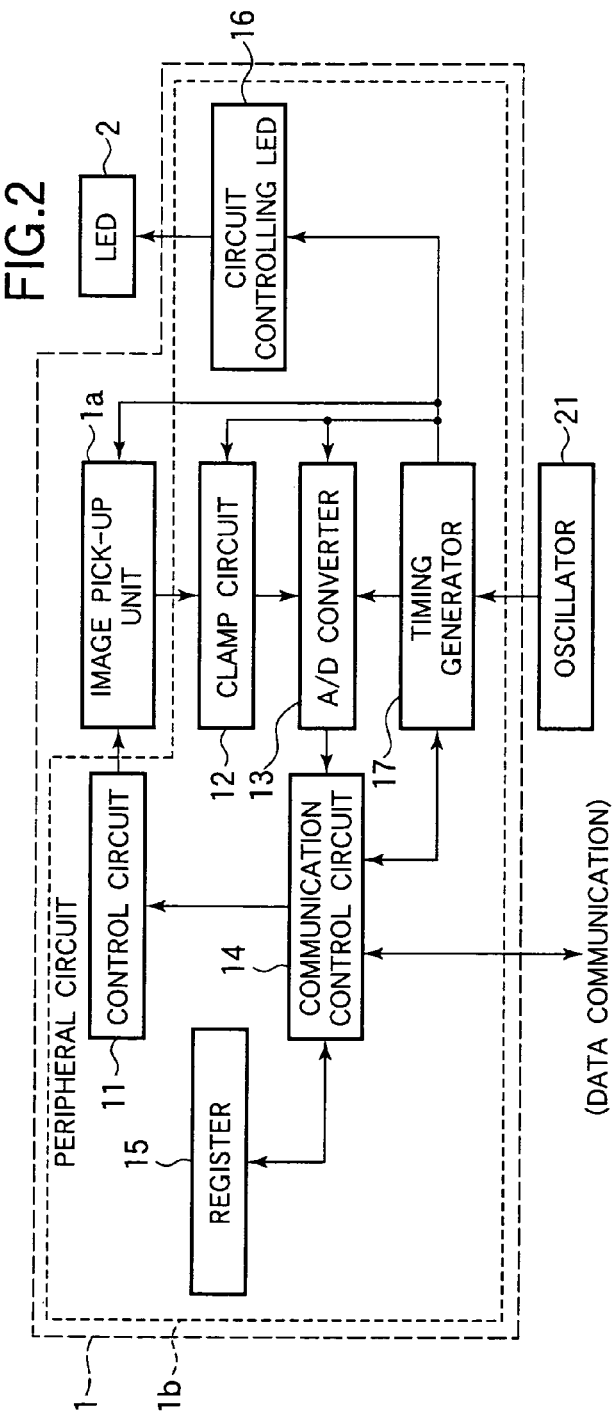
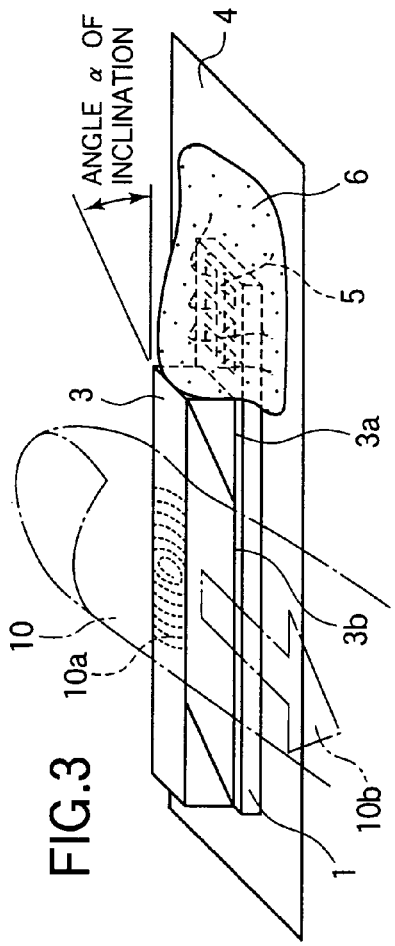

FINGERPRINT INPUT DEVICE AND PERSONAL AUTHENTICATION SYSTEM UTILIZING THE SAME

BACKGROUND OF THE INVENTION

1. Field of the Invention

The present invention relates to an ultra compact fingerprint input device, and more particularly to a fingerprint input device of in-finger scattering type in which a fiber optics plate constituting light transmitting means is fixed on a silicon chip bearing an image pickup element, and the interior of a finger placed on a surface of the fiber optics plate is irradiated with an infrared light, a near infrared light, a red light etc. and a light scattered from the interior of the finger is received through the fiber optics plate with the image pickup element to read the fingerprint of the finger.

2. Description of the Related Art

With the recent pervasiveness of the electronic trading and similar economic activities based on the remarkable progress in the information technologies, the necessity for electronic personal authentication is increasing for the purpose of avoiding improper use of information.

For electronic personal authentication, there have been employed various methods of inputting an image of a fingerprint. For example Japanese Patent Application Laid-open No. 2000-21780 discloses a method of emitting a near infrared light toward the interior of a finger, maintained in contact with the vicinity of a surface of a two-dimensional image pickup element and receiving a scattered light from the interior of the finger. This method allows to construct an extremely compact fingerprint input device without requiring a total reflecting prism or the like.

However, a semiconductor, including a solid image pickup element, is generally very fragile, and is easily broken by an application of a physical force or an electrostatic charge, or a deposition of moisture or salt caused by a direct contact of a finger or the like. In order to prevent such damage, light transmission means such as a fiber optics plate (hereinafter also represented as FOP) is usually adhered onto the silicon chip. The FOP is formed by adhering and cutting out a bundle of glass optical fibers, and can provide a chemical stability and strength far superior to those of the silicon chip at a suitably selected thickness.

Also as disclosed in Japanese Patent Application Laid-open No. 7-174947, it is known that a clear fingerprint image can be obtained by a suitable selection of an inclination angle α at the cutting of the FOP, as the light from a portion in contact with the fingerprint is easily transmitted while the light from other parts in contact with the air is scarcely transmitted. A prior configuration disclosed in Japanese Patent Application Laid-open No. 7-174947 is shown in FIG. 5.

Referring to FIG. 5, an FOP 3 on which a finger of a fingerprint inputting person is fixed by adhesion to an image pickup unit 1a on a silicon chip 1. An inclination angle α of the FOP 3 is about 30°, generally within a range of 20 to 40°, though an optimum value is variable depending on a refractive index of the optical fibers constituting the FOP.

The FOP is generally prepared by forming a bundle of a plurality of extremely fine optical fibers, then fixing the fibers under heat and pressure to obtain an ingot (block), cutting and polishing such ingot at a predetermined inclination angle. In order to improve the efficiency of manufacture, there is generally employed a method of at first preparing an ingot of a sufficiently large cross section, then slicing it into a plate with predetermined thickness and inclination angle, and finally cutting it into a predetermined planar dimension.

Since the FOP has an acute inclination angle of about 30° as mentioned above and also since the glass is brittle as known well, the FOP with a parallelogram cross section as shown in FIG. 5 is very easily chipped and is inconvenient for handling in the manufacture or for use in the fingerprint detection.

In case the FOP 3 is formed into a circumscribed rectangular cross section of the parallelogram as shown in FIG. 6A, there is generated a light non-transmitting area 3a not contributing to the transmission of the fingerprint image and optically constituting a shadow. A length L of such light non-transmitting area 3a is given by $L = T \cdot \tan(90° - \alpha)$ for an inclination angle α and a thickness T of the FOP 3, and usually becomes larger than T. In case the thickness T is selected at about 1 mm in order to withstand the pressure by the finger 10, the length L of the light non-transmitting area 3a becomes even larger.

Though it is also possible to construct such light non-transmitting area 3a as an overhanging portion protruding from the silicon chip 1 as shown in FIG. 6B, such structure is unsatisfactory in the strength and in the manufacturing process, since the FOP is subjected to a bending stress by the pressure of the finger 10.

SUMMARY OF THE INVENTION

The present invention has been made in consideration of the foregoing situation, and an object of the present invention is to provide a fingerprint input device which can prevent an increase in the area of the entire device and can simplify the manufacturing process, thereby enabling a compact configuration of the entire device.

The aforementioned object can be attained, according to the present invention, by forming circuits (peripheral circuits) other than an image pickup unit, for example a circuit for processing an output signal of an image pickup unit and a drive circuit for the image pickup unit, under a light non-transmitting surface namely in a shadow portion of an inclined fiber optics plate on a semiconductor substrate (silicon chip) to realize a fingerprint input device which can prevent an increase in the area of the entire device and can simplify the manufacturing process, thereby enabling a compact configuration of the entire device.

More specifically, the present invention provides a fingerprint input device including a light source for emitting a light into the interior of a finger of a fingerprint inputting person, an image pickup unit for receiving the light emitted from the light source and scattered in the interior of the finger, and a peripheral circuit unit connected to the image pickup unit thereby reading a fingerprint image of the finger based on a light reception signal of the image pickup unit through the peripheral circuit unit, the device being characterized in including a semiconductor substrate bearing an image pickup element constituting the aforementioned image pickup unit and an aforementioned peripheral circuit unit, and an inclined fiber optics plate fixed on the semiconductor substrate, having a surface on which the finger of the aforementioned fingerprint inputting person is placed and constituting light transmission means for transmitting the light, scattered from the interior of the finger placed on the aforementioned surface, to the image pickup element along a direction inclined by a predetermined angle, wherein at least a part of the peripheral circuit unit is formed on the semiconductor substrate opposed to a light non-transmitting area of the inclined fiber optics plate.

In the present invention, the light emitted from the light source can be any light adapted for use in a fingerprint input device of in-finger scattering type, and includes, for example, an infrared light, a near infrared light and a red light. Also the image pickup element can be, for example, a one-dimensional or two-dimensional image pickup element. An inclination angle of the light transmitted in the inclined fiber optics plate, though an optimum value being variable depending on a refractive index of the optical fibers constituting the fiber optics plate, is generally within a range of 20 to 40°, preferably about 30°, in case of ordinarily used optical fibers. Also the peripheral circuit unit includes all or a part of peripheral circuits such as a circuit for processing the output signal of the image pickup unit, a control circuit, a light source driving circuit etc.

At least a part of the peripheral circuit unit is preferably formed on the semiconductor substrate opposed to the light non-transmitting area of the inclined fiber optics plate and/or on the semiconductor substrate which is not contacted with the inclined fiber optics plate.

The image pickup unit is formed by an image pickup element of a predetermined dimension, and is rendered capable of collectively reading a fingerprint image of the finger placed on the surface of the inclined fiber optics plate by means of the image pickup element. In general, the image pickup element preferably has a dimension within a range of 10 to 20 millimeters square.

Otherwise, the image pickup unit is formed by an image pickup element of a predetermined dimension, and is rendered capable of reading a fingerprint image of the finger placed on the surface of the inclined fiber optics plate by means of the image pickup element, while the finger is made to slide in a predetermined direction along the surface. In general, the image pickup element preferably has a width within a range of 10 to 20 millimeters and a length of several millimeters or less. The predetermined direction can be, for example, a longitudinal direction of the finger.

Fibers constituting the inclined fiber optics plate are preferably positioned in an inclined manner along a predetermined direction. The predetermined direction can be, for example a direction of width of the inclined fiber optics plate.

The inclined fiber optics plate is preferably covered, in all the end portions or a part thereof, with an opaque resin.

A personal authentication system of the present invention is characterized in utilizing either one of the aforementioned fingerprint input devices.

This personal authentication system may also be provided with fingerprint registering means which registers in advance the fingerprint image of the finger, read by the fingerprint input device, as identification information for the aforementioned person, and fingerprint verification means which verifies whether the fingerprint image of the finger, read by the fingerprint input device matches with the image registered in the fingerprint registering means, and outputs the result of verification as a personal authentication signal.

Also an electronic equipment of the present invention is characterized in employing either one of the aforementioned personal authentication systems.

BRIEF DESCRIPTION OF THE DRAWINGS

FIGS. 1A and 1B are perspective views showing configuration of a fingerprint input device in a first embodiment of the present invention;

FIG. 2 is a block diagram showing a circuit configuration including a peripheral circuit unit;

FIG. 3 is a perspective view showing configuration of a fingerprint input device in a second embodiment of the present invention;

DESCRIPTION OF THE PREFERRED EMBODIMENTS

Figure 4:
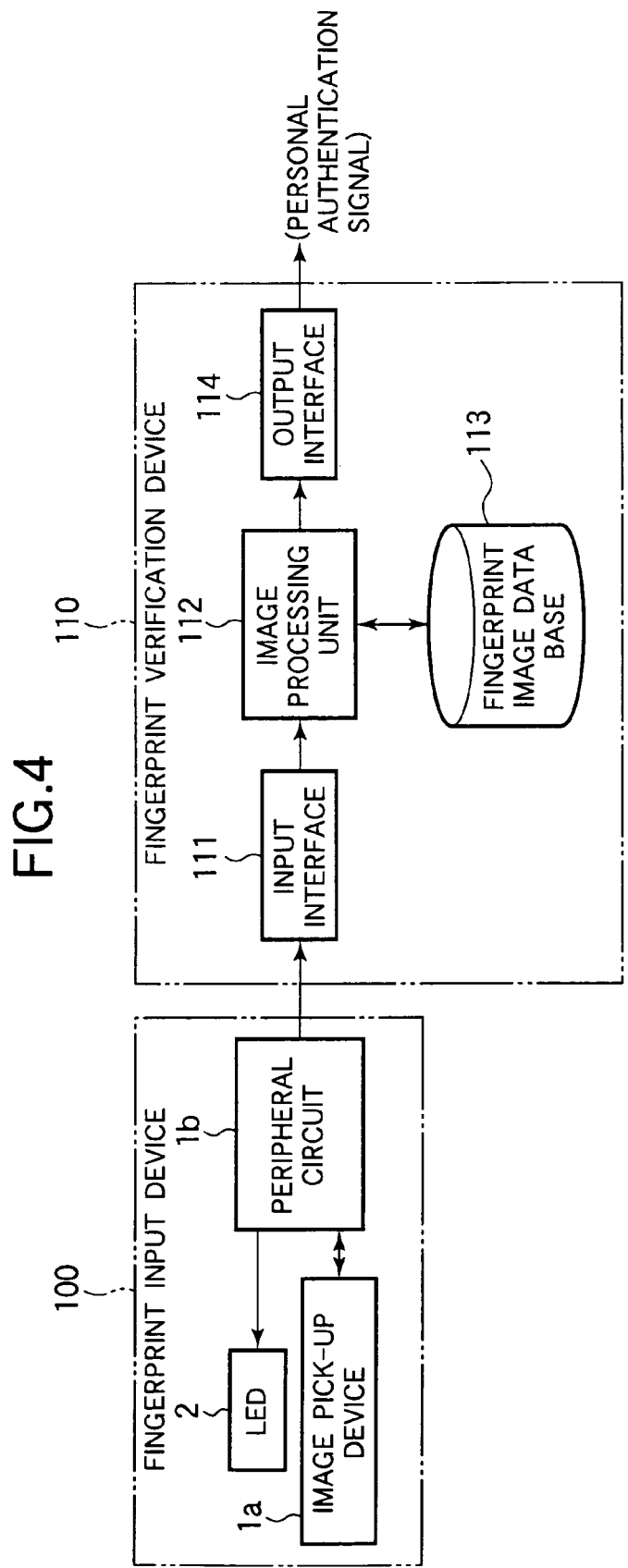
FIG. 4 is a view showing an entire configuration of a personal authentication system utilizing a fingerprint input device.
Figure 5:
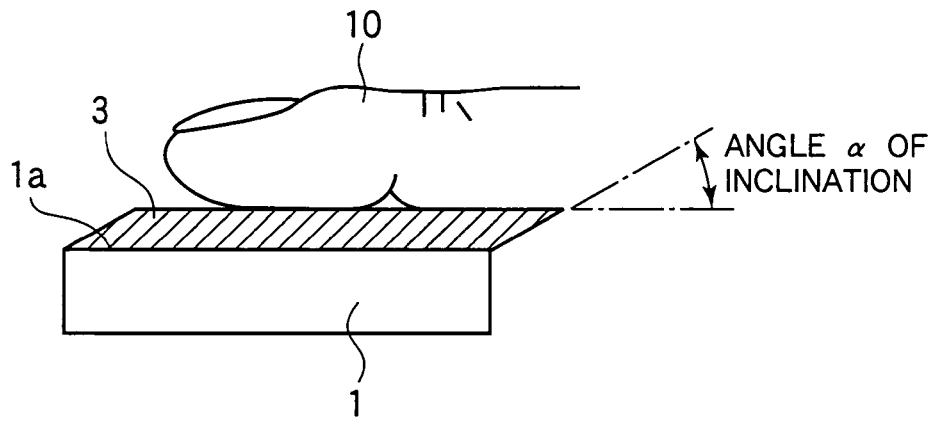
FIG. 5 is a cross-sectional view of a prior fingerprint input device.
Figure 6A:
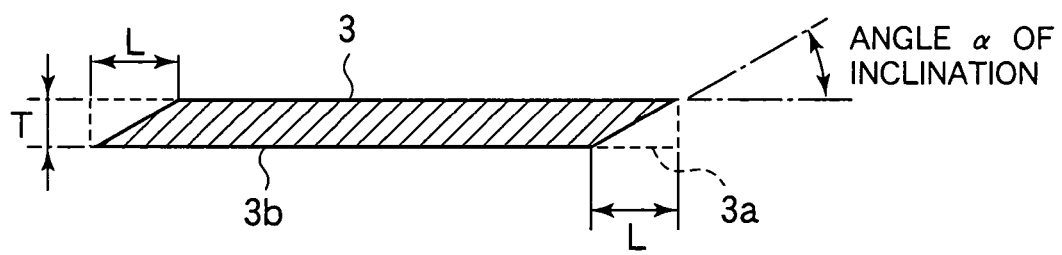
FIGS. 6A and 6B are cross-sectional views of a prior fiber optics plate.
Figure 6B:
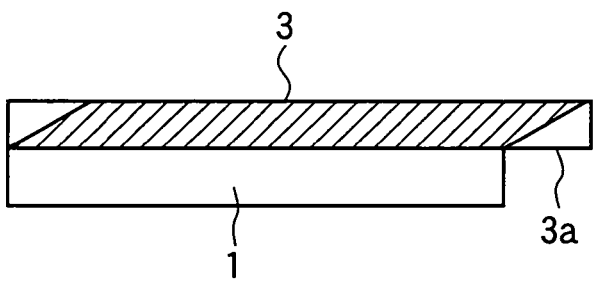

In the following, embodiments of the present invention will be explained with reference to accompanying drawings.

First Embodiment

FIGS. 1A and 1B are perspective views of a fingerprint input device in a first embodiment of the present invention. The present embodiment constitutes an application to a fingerprint input device of in-finger scattering type.

Referring to FIGS. 1A and 1B, there are shown a silicon chip (semiconductor substrate) 1, an image pickup unit 1a formed by a two-dimensional array of solid image pickup elements such as of CCD (charge coupled device) or CMOS (complementary metal oxide semiconductor) provided on the silicon chip, an LED (light emitting diode) 2 constituting a light source for emitting predetermined light such as infrared light, near infrared light or red light, an FOP (fiber optics plate) 3 formed as an inclined fiber optics plate fixed onto the silicon chip 1, a substrate 4 on which the silicon chip 1 is fixed, wires 5 electrically connected to plural electrodes on the silicon chip 1, a sealing resin 6, a finger 10 of a fingerprint inputting person, and a fingerprint 10a of the finger 10.

The solid image pickup elements constituting the image pickup unit 1a have a pitch of array of generally 50 micrometers (μm) or less, since a fingerprint input device requires, as an input condition for a fingerprint image, a resolution of 500 dpi (dot per inch) or higher.

The LED 2 is provided in a position capable of emitting light toward the interior of the finger 10 of the fingerprint inputting person, placed on the surface of the FOP 3.

There are also shown a peripheral circuit unit 1b including all or a part of circuits for controlling the image pickup unit 1a, processing the output signal and a control circuit for the LED 2 serving as the light source, and plural electrodes 1c for connecting circuits such as the image pickup unit 1a and the peripheral circuit unit 1b with circuit elements such as a circuit provided outside the silicon chip 1 and a power supply.

An example of the configuration of the circuits, including the peripheral circuit unit 1b formed on the silicon chip 1 is shown in a block diagram in FIG. 2.

Referring to FIG. 2, there is shown the aforementioned peripheral circuit unit 1b formed on the silicon chip 1. The peripheral circuit unit 1b includes a control circuit (drive circuit) 11 for controlling the function of the image pickup unit 1a, an A/D converter 13 for converting an analog image signal, corresponding to an image of the fingerprint 10a of the finger 10 outputted from the image pickup unit 1a, into a digital signal through a clamping circuit 12, a communication control circuit 14 for communicating the digital signal, converted in the A/D converter 13, as an image signal of the fingerprint 10a to a external apparatus (such as an interface), a register 15 connected to the communication control apparatus 14, an LED control circuit 16 for controlling the light emission of the LED 2, and a timing generator 17 for generating control pulses for controlling operating timings of the aforementioned circuits 11-16, based on reference pulses supplied from an external oscillator 21. The circuits including the peripheral circuit unit 1b are not limited to those described above but may include circuits of other types. Also a part of the aforementioned circuits may be provided on an unillustrated separate chip.

Now the functions of the aforementioned fingerprint input device will be explained with reference to FIGS. 1A, 1B and 2.

At first, the finger 10 of the fingerprint inputting person is placed on the FOP 3, and the LED 2 emits light such as infrared light, near infrared light or red light according to a control signal from the LED control circuit 16, toward the interior of the finger 10.

The light is scattered in the interior of the finger 10, then is introduced and transmitted along the inclination angle α of the FOP 3, as an optical signal corresponding to the fingerprint image of the fingerprint 10a, and is transmitted to the image pickup unit 1a through a light transmitting surface 3b.

The signal received by the image pickup unit 1a is read as an analog image signal according to a drive signal from the control circuit 11, then is converted through the clamping circuit 12 into a digital signal by the A/D converter 13, and is outputted, as fingerprint image data reflecting the fingerprint 10a of the finger 10 of the fingerprint inputting person, to the exterior by the communication control circuit 14.

In the following, there will be explained an example of arrangement and design of the circuits of the fingerprint input device.

As shown in FIG. 1A, an FOP 3 of an inclination angle α (for example about 30°) and a thickness T (for example about 0.5 to 1 mm) is fixed by adhesion onto the silicon chip 1. In this arrangement, among the light non-transmitting surfaces of the FOP 3, at least a light non-transmitting surface (light non-transmitting area) 3a at a side opposed to the silicon chip is so positioned as to cover all or a part of the peripheral circuit 1b.

The silicon chip 1 is fixed by adhesion to the substrate 4, then the electrodes 1c and electrodes (not shown) on the substrate 4 are connected by the metal wires 5 utilizing the known wire bonding technology, and the sealing resin for protection is coated and hardened.

The image pickup unit 1a has an area of about 10 to 20 millimeters square, and an area of the FOP 3 is larger by the light non-transmitting area 3a.

The thickness T of the FOP 3 preferably is preferably maintained at a minimum value not breakable by the pressure with the finger 10 in consideration of the imaging performance and the production cost, and is generally selected within a range of about 0.5 to 1 mm.

The length L of a side of the light non-transmitting area 3a is about 0.9 to 1.7 mm in case the inclination angle α of the FOP 3 is selected about 30°.

Therefore, in the present embodiment, by suitably selecting the circuit magnitude and the design rule of the peripheral circuit unit 1b in such a manner that the length of a side thereof is equal to or larger than the length L of the light non-transmitting area 3a of the FOP 3, there can be realized a fingerprint input device without generating an ineffective area on the silicon chip 1 by the light non-transmitting area 3a, and also satisfactory in the strength of the FOP 3.

In this manner, by forming the peripheral circuit unit 1b other than the image pickup unit 1a, such as the circuit for processing the output signal of the image pickup unit and the drive circuit for the image pickup unit, under the light non-transmitting surface namely in the shadow portion of the FOP 3 to realize a fingerprint input device which can prevent an increase in the area of the entire device and can simplify the manufacturing process, thereby enabling a compact configuration of the entire device.

In the aforementioned fingerprint input device, in case an unnecessary light (not shown) enters the light non-transmitting area 3a from an end portion of the FOP 3, it may reach the peripheral circuit unit 1b. It is generally known that a semiconductor device, under a strong light irradiation, may generate a leak current thereby resulting in an erroneous operation of the circuit. For preventing such phenomenon, it is usual to provide a light-shielding layer such as an aluminum film on the peripheral circuit unit 1b.

In the present embodiment, the sealing resin 6 is made opaque to the light and is made to cover all or a part of the end portion of the FOP 3. In this manner it becomes unnecessary to form a light shielding layer thereby simplifying the manufacturing process of the semiconductor chip and reducing the cost thereof.

Second Embodiment

FIG. 3 is a perspective view of a fingerprint input device of a second embodiment of the present invention.

In the fingerprint input device shown in FIG. 3, as in the first embodiment, a peripheral circuit unit is provided on the silicon chip 1, on which the FOP 3 is fixed, in a position corresponding to the light non-transmitting portion of the FOP 3, but, in contrast to the first embodiment in which the fingerprint 10a of the finger 10 of the fingerprint inputting person placed on the FOP 3 is collectively read, there is employed a sweeping method in which the finger 10 is made to slide along a longitudinal direction thereof, for example in a direction indicated by an arrow 10b in FIG. 3, thereby entering the fingerprint image in succession (substrate 4, wires 5 and sealing resin 6 being similar to those in the first embodiment).

Referring to FIG. 3, an unillustrated image pickup unit 1b is constituted of solid image pickup elements of a resolution same as that of the first embodiment, arranged in an array of a width of 10 to 20 mm and a length of several millimeters in the perpendicular direction. In the present embodiment, the FOP 3 has an inclination angle α only in a direction of width.

Thus the present embodiment, being applied to the fingerprint input device of sweep method and decreasing the areas of the silicon chip 1 and the FOP 3 as explained above, can realize an extremely compact and inexpensive fingerprint input device. Also the inclination angle α is provided only in the direction of width to prevent an increase in the longitudinal dimension of the silicon chip or the FOP.

Also in the present embodiment, it is possible to dispense with the light shielding layer on the peripheral circuit unit, as in the first embodiment, by employing an opaque resin for the sealing resin 6 provided for protecting the electrodes at the end of the silicon chip 1 and the wires 5 connected thereto, coating such resin so as to cover the end portion of the FOP 3.

In the following, there will be explained, with reference to FIG. 4, an example of application of the aforementioned fingerprint input device to a personal authentication system.

A personal authentication system shown in FIG. 4 is provided with a fingerprint input device 100 including an image pickup unit 1a, a peripheral circuit unit 1b and an LED 2 as explained in the foregoing, and a fingerprint verification device 110 connected to the fingerprint input device 100. The fingerprint verification device 110 is provided with an input interface 111 for entering communication data outputted from the communication control unit of the peripheral circuit unit 1b, an image processing unit (fingerprint verification means) 112 connected to the input interface 111, a fingerprint image database. (fingerprint registration means) 113 connected to the image processing unit 112, and an output interface 114. The output interface 114 is connected to an electronic equipment (also including a software) which requires a security at use or at login.

The fingerprint image database 113 registers in advance the fingerprint image of the finger of an object person who is to be individually identified. The object person may be a single person or plural persons. The fingerprint image of the object person is entered in advance, as the personal authentication information of the object person, from the fingerprint input device 100 through the input interface 111, at the initialization or at the addition of an object person. The image processing unit 112 receives the fingerprint image, read by the fingerprint input device 100, through the input interface 111, then executes verification as to whether the fingerprint image matches with the image registered in the fingerprint image database 113 based on a known fingerprint verifying image processing algorithm, and outputs the result of verification (whether the fingerprints match or do not match) as a personal authentication signal through the output interface 114.

In the present example, the fingerprint input device 100 and the fingerprint verification device 110 are constructed as separate devices, but the present invention is not limited to such configuration and at least a part of the functions of the fingerprint verification device 110 may be integrally constructed in the peripheral circuit unit 1b of the fingerprint input device 100. Also the personal authentication system of the present example may be integrally constructed in the electronic equipment requiring the personal authentication or may be constructed separately from the electronic equipment.

According to the present invention, as explained in the foregoing, at least a part of the peripheral circuit unit is provided under a light non-transmitting surface of an inclined fiber optics plate on a semiconductor substrate to realize a fingerprint input device which can prevent an increase in the area of the entire device and can simplify the manufacturing process, thereby enabling a compact configuration of the entire device.

What is claimed is:

1. A fingerprint input device including a light source for emitting a light into an interior of a finger of a fingerprint inputting person, an image pickup unit for receiving the light emitted from said light source and scattered in the interior of said finger, and a peripheral circuit unit connected to said image pickup unit thereby reading a fingerprint image of said finger based on a light reception signal of said image pickup unit through said peripheral circuit unit, the device comprising:

a semiconductor substrate bearing an image pickup element constituting said image pickup unit and said peripheral circuit unit; and an inclined fiber optics plate, fixed on said semiconductor substrate, having a surface on which the finger of said fingerprint inputting person is placed and constituting light transmission means for transmitting the light, scattered from the interior of said finger placed on said surface, to said image pickup element along a direction inclined by a predetermined angle;

wherein at least a part of said peripheral circuit unit is formed on said semiconductor substrate opposed to a light non-transmitting area of said inclined fiber optics plate, and the light non-transmitting area is fixed to the semiconductor substrate, and does not transmit the light scattered from the interior of said finger.

2. A fingerprint input device according to claim 1, wherein at least another part of said peripheral circuit unit is formed on said semiconductor substrate where said inclined fiber optics plate does not contact.

3. A fingerprint input device according to claim 1 or 2, wherein said image pickup unit is constituted of image pickup elements of a predetermined dimension and is adapted to collectively read, through said image pickup elements, a fingerprint image of said finger placed on the surface of said inclined fiber optics plate.

4. A fingerprint input device according to claim 1 or 2, wherein said image pickup unit is constituted of image pickup elements of a predetermined dimension and is adapted to collectively read, through said image pickup elements, a fingerprint image of said finger placed on the surface of said inclined fiber optics plate, while said finger is made to slide in a predetermined direction along said surface.

5. A fingerprint input device according to claim 4, wherein fibers constituting said fiber optics plate are arranged in an inclined manner along a predetermined direction.

6. A fingerprint input device according to claim 1, wherein said inclined fiber optics plate is covered in all of end portions thereof or a part thereof with an opaque resin.

7. A personal authentication system characterized in comprising a fingerprint input device according to claim 1.

8. A personal authentication system according to claim 7, further comprising:

fingerprint registering means which registers in advance a fingerprint image of a finger, read by said fingerprint input device, as identification information for a person; and fingerprint verification means which verifies whether the fingerprint image of said finger, read by said fingerprint input device matches with the image registered in said fingerprint registering means, and outputs a result of the verification as a personal authentication signal.

9. An electronic equipment characterized in comprising the personal authentication system according to claim 7 or 8.

* * * * *